C. H. WILLIAMS.
THIRD POINT SUPPORT FOR BRAKE BEAMS.
APPLICATION FILED FEB. 27, 1918.

1,278,540.

Patented Sept. 10, 1918.
2 SHEETS—SHEET 1.

Inventor
Charles Haines Williams
By J. H. Cornwall, Atty.

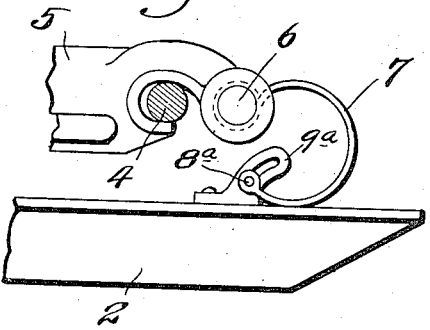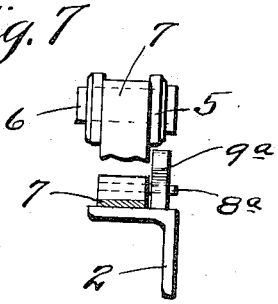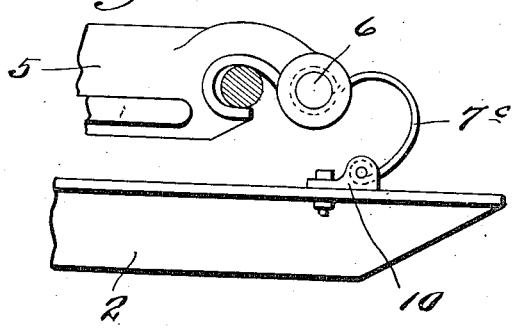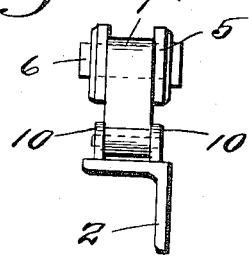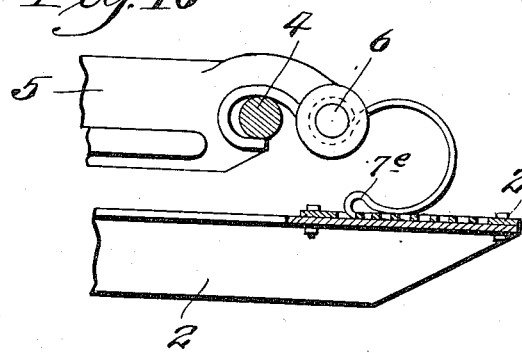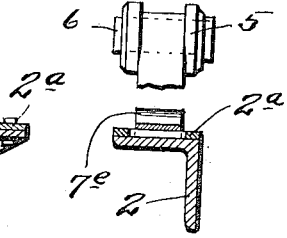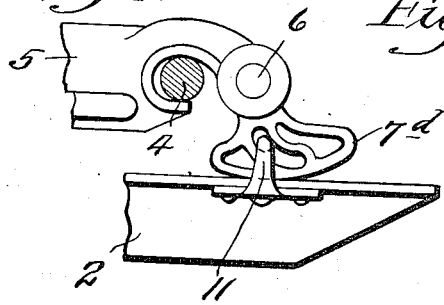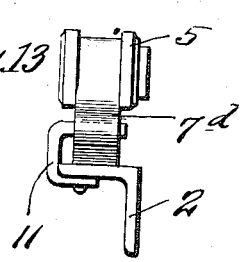

UNITED STATES PATENT OFFICE.

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD-POINT SUPPORT FOR BRAKE-BEAMS.

1,278,540.

Specification of Letters Patent.

Patented Sept. 10, 1918.

Application filed February 27, 1918. Serial No. 219,432.

*To all whom it may concern:*

Be it known that I, CHARLES HAINES WILLIAMS, a citizen of the United States, residing at Chicago, Illinois, have invented a certain new and useful Improvement in Third-Point Supports for Brake-Beams, of which the following is a full, clear, and exact description, such as will enable others skilled in the art to which it appertains to make and use the same, reference being had to the accompanying drawings, forming part of this specification, in which—

Fig. 6 illustrates a modified form of anchorage.

Fig. 7 is an elevational view of the form of anchorage shown in Fig. 6.

Fig. 8 is another modified form.

Fig. 9 is an edge elevational view of the form shown in Fig. 8.

Fig. 10 is a modified form showing a slip connection.

Fig. 11 is an end elevational view of the form shown in Fig. 10.

Fig. 12 is a modified form of anchorage.

Fig. 13 is an edge elevational view of the form shown in Fig. 12.

Figure 1:
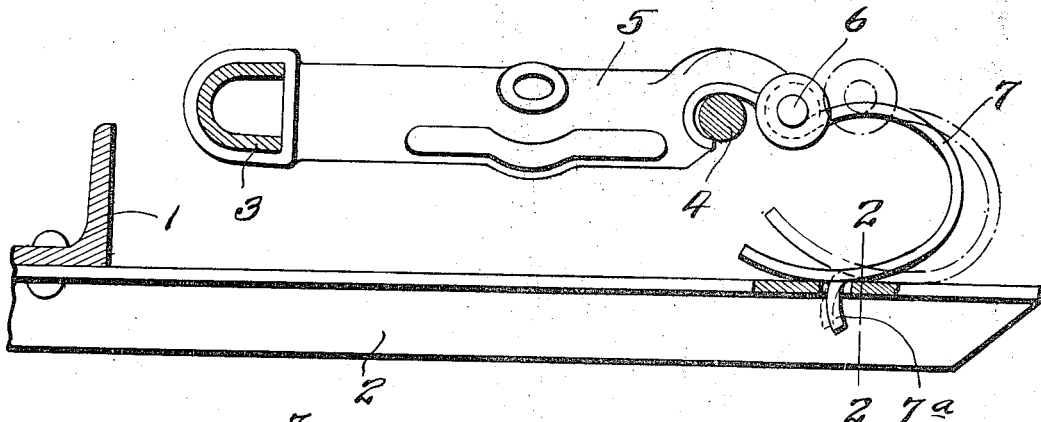
Figure 1 is a side elevational view of one form of my improved third point support.
Figure 2:
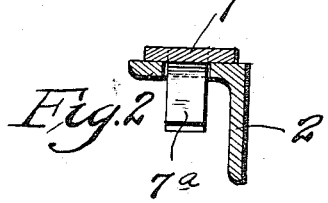
Fig. 2 is a cross sectional view on line 2—2 of Fig. 1.

This invention relates to a new and useful improvement in third point supports for brake beams, the object being to arrange the third point support at the end of the strut so that it will possess the requisite resiliency while coöperating with a rigid safety bar or track and have an easy rolling or rocking movement thereover which will lift the inner end of the beam the requisite height in applying the brakes.

Another object is to anchor the rocking element so that it is not liable to displacement through slipping or breaking of contact between the rigid bar and the resilient support, and to insure that when the beam has power applied thereto in the application of the brakes, it will have a uniform rising movement in applying the brakes irrespective of the initial position of the brake hangers.

In the drawings, 1 indicates a spring plank or other part of a truck to which the rigid safety bar or track 2 is secured. This bar or track is preferably in the form of an angle, and its horizontal web may be perforated or have devices secured thereto for anchoring the rolling resilient member which supports the forward or inner end of the strut. 3 is the compression member of the beam, 4 the tension member thereof, and 5 the strut, the nose of which latter is provided with a pin or bearing point 6 upon which is arranged the eye of a rolling resilient member 7. This rolling movement member is preferably in the form of a flat bar appropriately shaped and made of spring metal, there being a tongue 7ª pressed therefrom which operates in an opening in the horizontal flange of the track member 2 whereby in its rolling action, the resilient third point support 7 is anchored to the safety bar or track 2.

The tongue 7ª is of sufficient length so as to prevent accidental displacement, and consequently regardless of the wear on the brake shoes and the position of the brake hangers, the nose of the strut will be properly and resiliently lifted at each application of the brakes.

Figure 3:
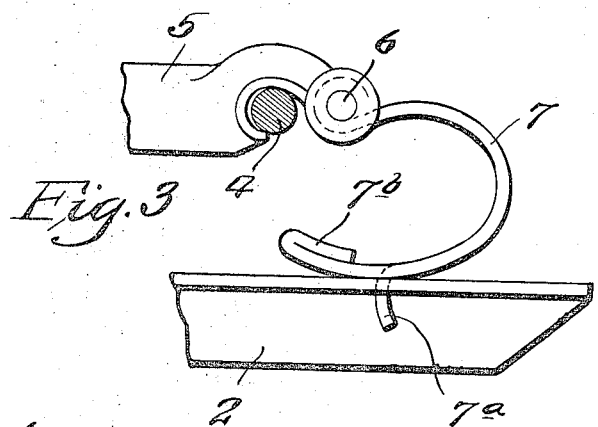
Fig. 3 is a modified form.

In Fig. 3, I have shown a modified form of a rolling resilient member in which the lower end is folded upon itself, as at 7ᵇ, so as to add weight which will assist in returning the support to position. Where a weight is used at the free end of the resilient rolling support, such as the folded portion 7ᵇ, just above referred to, the anchorage 7ª may be dispensed with. The weight, by action of gravity, will insure the cam or resilient member returning to its proper suspended position, such as when the car is stopped, or due to the vibration or jolting of the track in going over low joints, etc., which causes a separation of the parts permitting the cam to return to its effective position. When this rolling contact is broken and there is no anchorage, the properly weighted spring cam will drop or hang naturally in such position as to act properly when contact is again established.

Figure 4:
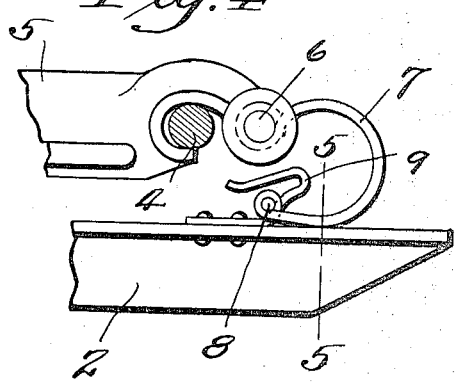
Fig. 4 is a modified form of anchorage.
Figure 5:
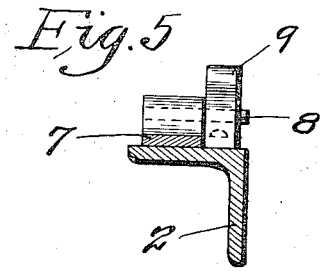
Fig. 5 is a sectional view on line 5—5 of Fig. 4.

In Figs. 4 and 5, I have shown the rolling resilient member as having a pin 8 at its lower end which coöperates with a guide bracket 9 secured to the horizontal flange of the safety bar or track whereby the lower end of the rolling resilient member is anchored in position.

In Figs. 6 and 7, substantially the same form is disclosed as is illustrated in Figs. 4 and 5 except that in this instance, the pin 8ª operates in a closed slot in the bracket 9ª.

In Figs. 8 and 9, the rolling resilient member 7ᶜ is pivoted to an angle bracket 10, any arcuate movement of the member 7ᶜ in the application of the brakes being upwardly and inwardly so as to lift the nose of the strut as in the other forms.

In Figs. 10 and 11, I have shown a resilient rolling member having a hooked lower end 7ᵉ which coöperates with recesses or projections formed in the track plate or in a piece 2ª secured thereto, the purpose of this construction being that when the brake shoes wear and the rolling resilient member is rocked so that its hooked end disengages or is disengaged from the plate 2ª, it will slip from one recess to another and cause the brake hangers to take up slack in subsequent operations of the brake.

In Figs. 12 and 13, I have shown a weighted rolling member 7ᵈ having a slot which coöperates with a pin in the bracket 11, which latter anchors the member 7ᵈ to the safety bar or track.

It will be readily understood, of course, that still other modifications and adaptations of my improved third point support for brake beams may be made without departing from the scope and spirit of what I claim to be my invention.

What I claim is:

1. In a support for brake beams, a rolling member, in combination with means for anchoring said rolling member to said support whereby rolling action of the support occurs upon the initial movement of the brake toward the wheels.

2. In a support for brake beams, a resilient rolling member in combination with a rigid support, and means for anchoring said rolling member to said support.

3. In a support for brake beams, a resilient rolling member in combination with a rigid support, and means for anchoring said rolling member to said support, said anchorage permitting a freedom of movement of one end of said rolling member.

4. A support for brake beams comprising a rigid track member, a resilient rolling member pivotally connected to said brake beam at one end, and means at the opposite end of said rolling member for anchoring the same to said support, thereby compelling an initial rolling action of said resilient rolling member when the brake is being moved toward the wheels.

5. In a support for brake beams, a resilient rolling member having a hooked lower end in combination with a support having projections or recesses with which said hooked end engages.

6. In a support for brake beams, a resilient C-shaped rolling member having a weighted lower end in combination with a rigid support between which parts there is an anchoring connection.

7. In a support for brake beams, a resilient rolling member pivotally mounted on the beam and having a weighted lower end for the purposes described.

In testimony whereof I hereunto affix my signature this 9th day of February, 1918.

CHARLES HAINES WILLIAMS.

Witnesses:
E. T. WALKER,
M. F. HUNTOON.